United States Patent
Yumoto

(10) Patent No.: US 8,152,479 B2
(45) Date of Patent: Apr. 10, 2012

(54) LIQUID PRESSURE-FEED DEVICE

(75) Inventor: Hideaki Yumoto, Kakogawa (JP)

(73) Assignee: TLV Co., Ltd., Hyogo-ken (JP)

( * ) Notice: Subject to any disclaimer, the term of this patent is extended or adjusted under 35 U.S.C. 154(b) by 1080 days.

(21) Appl. No.: 12/072,516

(22) Filed: Feb. 26, 2008

(65) Prior Publication Data

US 2008/0226469 A1    Sep. 18, 2008

(30) Foreign Application Priority Data

Mar. 15, 2007   (JP) .................................. 2007-66449

(51) Int. Cl.
*F04B 3/00* (2006.01)
(52) U.S. Cl. ........................................ 417/133; 417/132
(58) Field of Classification Search .................. 417/126, 417/130–135; 62/246; 137/391, 418, 445
See application file for complete search history.

(56) References Cited

U.S. PATENT DOCUMENTS

| | | | |
|---|---|---|---|
| 5,755,560 A | * | 5/1998 | Yumoto .......................... 417/133 |
| 6,244,829 B1 | * | 6/2001 | Yumoto .......................... 417/133 |
| 6,599,096 B1 | * | 7/2003 | Totten et al. .................. 417/133 |

* cited by examiner

*Primary Examiner* — Charles Freay
*Assistant Examiner* — Todd D Jacobs
(74) *Attorney, Agent, or Firm* — Kenyon & Kenyon LLP

(57) ABSTRACT

A liquid pressure-feed device is provided wherein, even with a third shaft disposed between a pivot shaft and a second shaft, a sub-arm positioned between the pivot shaft and the second shaft does not obstruct movement of the third shaft. A snap mechanism has a pivot shaft supported within a closed vessel, a float arm and a sub-arm both adapted to rotate about the pivot shaft, a first shaft supported by the float arm, a second shaft supported by the sub-arm, and a spring mounted between the first and second shafts. A liquid discharge valve has a third shaft supported by the float arm, a liquid discharge valve arm mounted to the third shaft, and a liquid discharge valve body mounted to the liquid discharge valve arm to establish and block communication between the interior of the closed vessel and a liquid discharge port. The third shaft is disposed between the pivot shaft and the second shaft and a window is formed in the sub-arm so as not to obstruct movement of the third shaft.

1 Claim, 3 Drawing Sheets

LIQUID PRESSURE-FEED DEVICE

FIELD OF THE INVENTION

The present invention relates to a liquid pressure-feed device for the feed of liquid such as hot water or fuel under pressure. The liquid pressure-feed device of the present invention is suitable particularly as a device for feeding condensate generated in various steam-using devices to a boiler or a place utilizing waste heat.

BACKGROUND OF THE INVENTION

According to a conventional liquid pressure-feed device disclosed in Japanese Patent Laid-Open Publication No. Hei 8 (1996)-114175, a working fluid inlet port, a working fluid discharge port, a liquid inlet port and a liquid discharge port are formed in a closed vessel, and a float, a change-over valve, a snap mechanism and a liquid discharge valve are provided within the closed vessel, the snap mechanism having a pivot shaft supported within the closed vessel, a float arm and a sub-arm both adapted to rotate about the pivot shaft, further having a first shaft supported by the float arm, a second shaft supported by the sub-arm, and a spring mounted between the first and second shafts, the liquid discharge valve having a third shaft supported by the float arm, a liquid discharge valve arm mounted to the third shaft, and a liquid discharge valve body mounted to the liquid discharge valve arm to establish and block communication between the interior of the closed vessel and the liquid discharge port, the float being connected to the float arm, and the change-over valve being connected to the sub-arm through a power transfer shaft, with the pivot shaft being provided between the second and third shafts.

Thus, in the above conventional liquid pressure-feed device, the pivot shaft is provided between the second and third shafts. It is not that the third shaft is provided between the pivot shaft and the second shaft. This is because if the third shaft is provided between the pivot shaft and the second shaft there will arise the problem that the sub-arm positioned between the pivot shaft and the second shaft obstructs the movement of the third shaft.

SUMMARY OF THE INVENTION

It is an object of the present invention to provide a liquid pressure-feed device wherein, even with a third shaft disposed between a pivot shaft and a second shaft, a sub-arm positioned between the pivot shaft and the second shaft does not obstruct movement of the third shaft.

According to the present invention there is provided a liquid pressure-feed device comprising a closed vessel, the closed vessel having a working fluid inlet port, a working fluid discharge port, a liquid inlet port and a liquid discharge port, with a float, a change-over valve, a snap mechanism and a liquid discharge valve being provided within the closed vessel, the snap mechanism having a pivot shaft supported within the closed vessel, a float arm and a sub-arm both adapted to rotate about the pivot shaft, further having a first shaft supported by the float arm, a second shaft supported by the sub-arm, and a spring mounted between the first and second shafts, the liquid discharge valve having a third shaft supported by the float arm, a liquid discharge valve arm mounted to the third shaft, and a liquid discharge valve body mounted to the liquid discharge valve arm to establish and block communication between the interior of the closed vessel and the liquid discharge port, the float being connected to the float arm, and the change-over valve being connected to the sub-arm through a power transfer shaft, characterized in that the third shaft is provided between the pivot shaft and the second shaft and that a window is formed in the sub-arm so as not to obstruct movement of the third shaft.

Thus, in the present invention, the third shaft is provided between the pivot shaft and the second shaft, and the window is formed in the sub-arm so as not to obstruct movement of the third shaft. According to this construction, the third shaft can be disposed between the pivot shaft, and the second shaft both constituting a part of the snap mechanism, and it is possible to attain the reduction in size of the liquid pressure-feed device. Such an excellent effect can be attained by the present invention.

In the present invention, the third shaft is disposed between the pivot shaft and the second shaft and the window is formed in the sub-arm so as not to obstruct movement of the third shaft. That is, by forming the window in the sub-arm so as not to obstruct movement of the third shaft, the sub-arm does not obstruct movement of the third shaft even if the third shaft is disposed between the pivot shaft and the second shaft.

DETAILED DESCRIPTION

Figure 1:
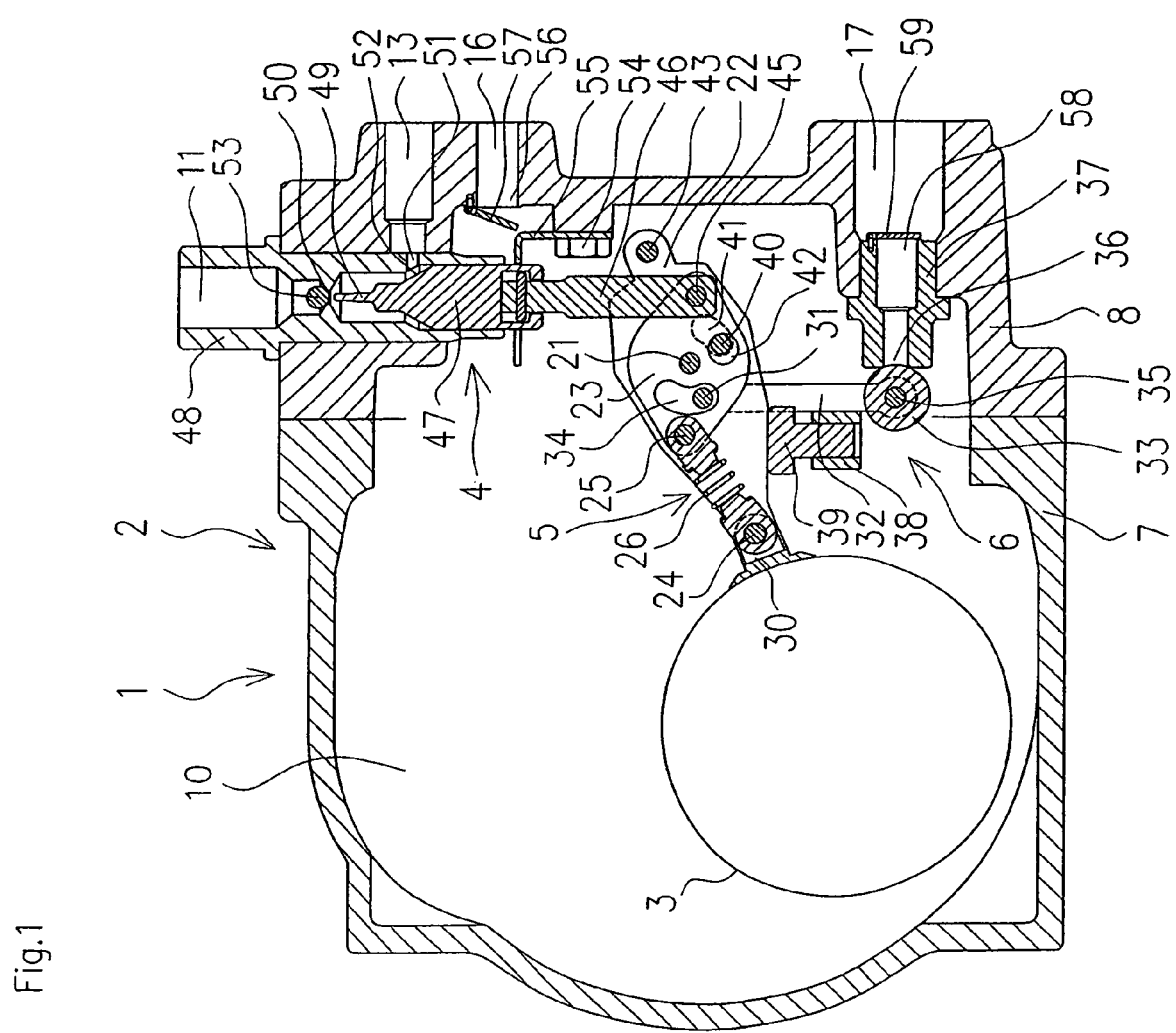
FIG. 1 is a sectional view of a liquid pressure-feed device according to an embodiment of the present invention.
Figure 2:
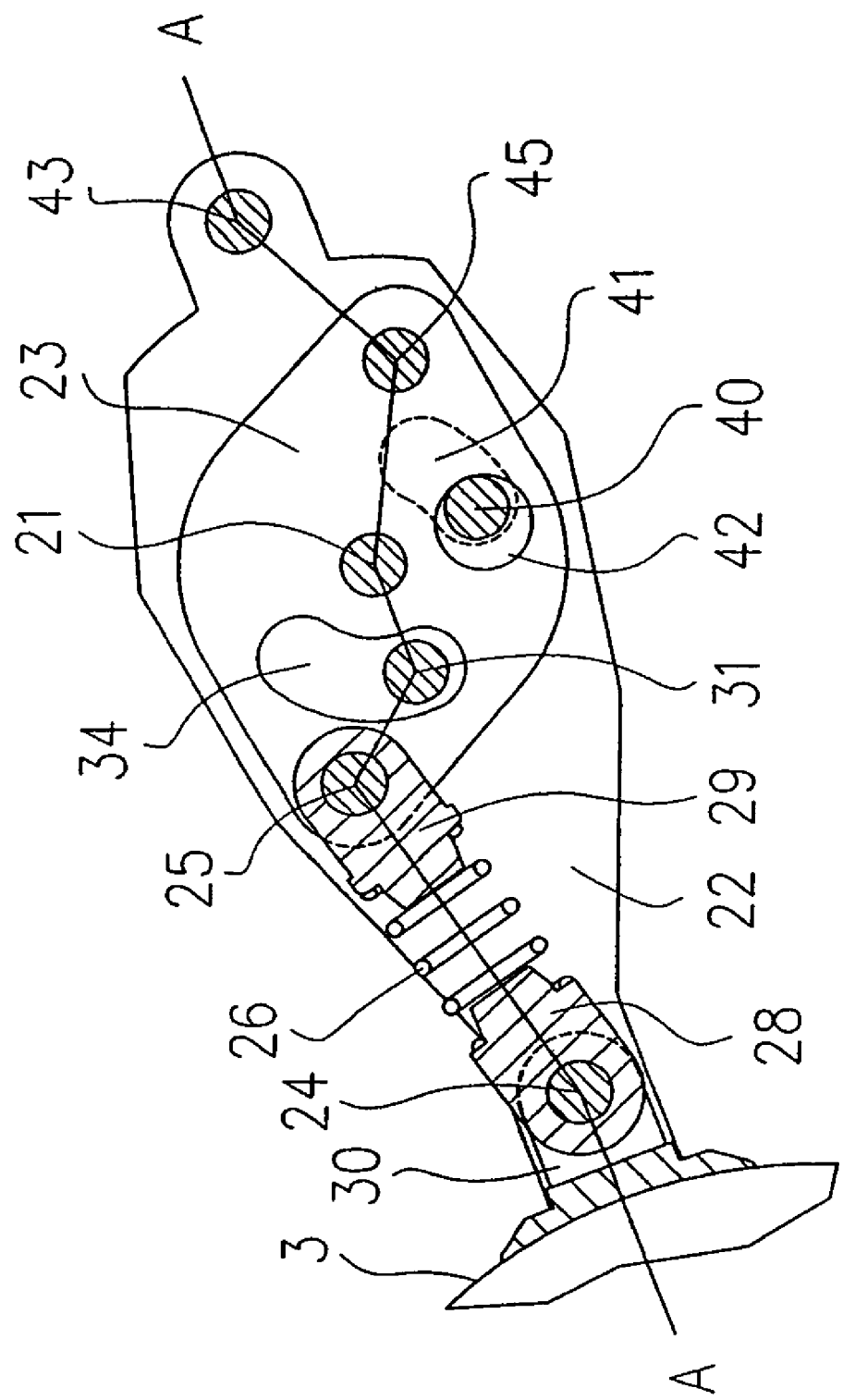
FIG. 2 is an enlarged sectional view of a snap mechanism portion shown in FIG. 1.
Figure 3:
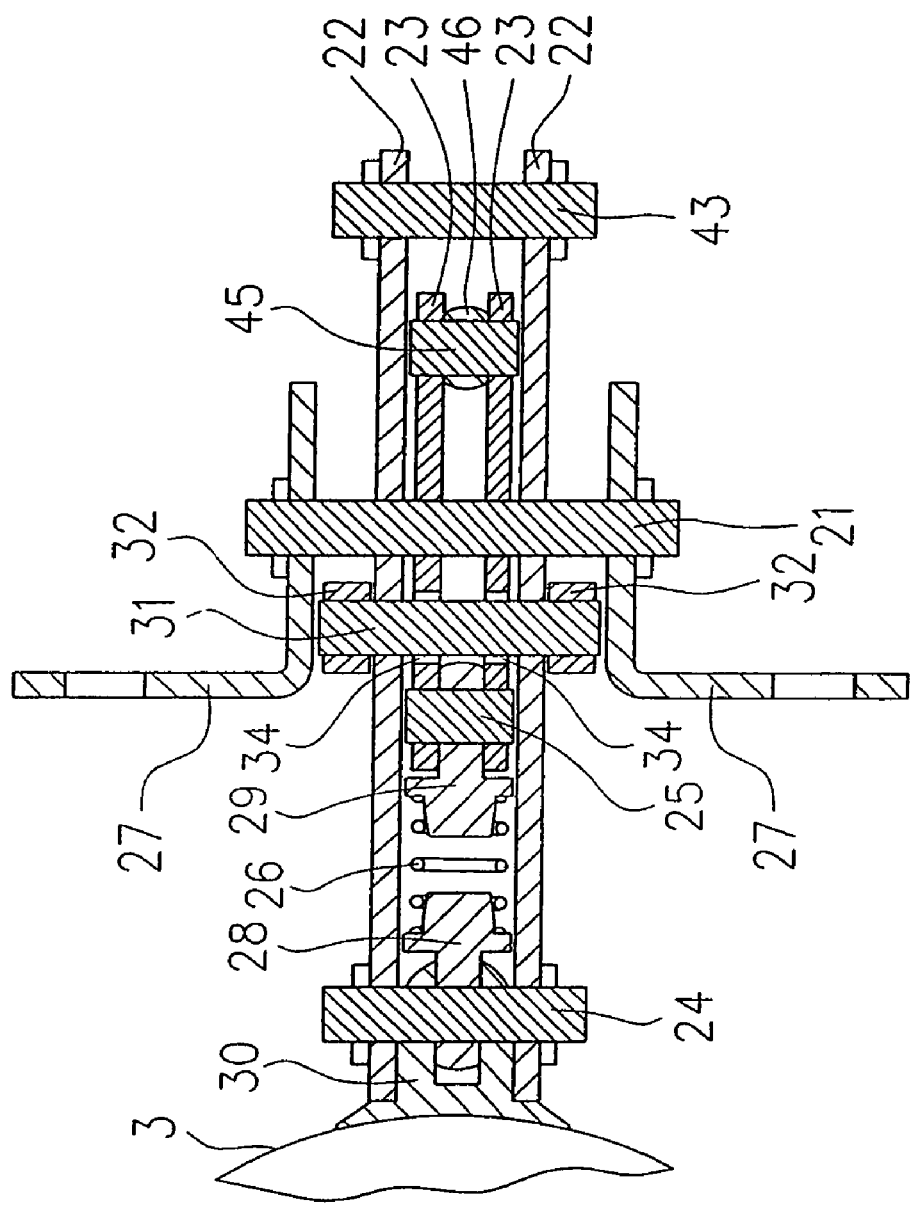
FIG. 3 is a sectional view taken on line A-A in FIG. 2.

A description will be given about an embodiment of the present invention showing a concrete example of the above technical means. FIG. 1 is a sectional view of a liquid pressure-feed device according to an embodiment of the present invention, FIG. 2 is an enlarged sectional view of a snap mechanism portion shown in FIG. 1 with line A-A inserted therein, and FIG. 3 is a sectional view taken on line A-A in FIG. 2. According to a liquid pressure-feed device 1 of this embodiment, a float 3, a change-over valve 4, a snap mechanism 5 and a liquid discharge valve 6 are disposed within a closed vessel 2. The closed vessel 2 is made up of a body 7 and a lid 8 both joined together with screws (not shown), with a liquid sump space 10 being formed in the interior of the vessel. A working fluid inlet port 11, a working fluid discharge port 13, a liquid inlet port 16 and a liquid discharge port 17 being formed in the lid 8.

The snap mechanism 5 is made up of a pivot shaft 21 supported within the closed vessel 2, a float arm 22 and a sub-arm 23 both adapted to rotate about the pivot shaft 21, a first shaft 24 supported by the float arm 22, a second shaft 25 supported by the sub-arm 23, and a coil spring 26 mounted in a compressed state between the first and second shafts 24, 25. The pivot shaft 21 is supported within the closed vessel 2 by a bracket 27. The bracket 27 is constituted by two plates, which are each integrally secured to the lid 8 of the closed vessel 2 with screws (not shown).

The float arm 22 is constituted by two plates opposed to each other in parallel and the first shaft 24, which is parallel to the pivot shaft 21, is mounted bridgewise on left end portions of the two plates. Further, a mounting portion 30, which is fixed to the float 3, is connected to the first shaft 24. A first spring bearing member 28 is supported rotatably by the first shaft 24 and the float arm 22 is rotatably supported nearly centrally by the pivot shaft 21. Accordingly, the float arm 22 pivots up and down around the pivot shaft 21 while following rise and fall of the float 3.

The sub-arm 23 is rotatably supported nearly centrally by the pivot shaft 21. The sub-arm 23 is constituted by two plates opposed to each other in parallel and the second shaft 25, which is parallel to the pivot shaft 21, is mounted bridgewise on left end portions of the two plates. A second spring bearing member 29 is supported rotatably by the second shaft 25 and the coil spring 26 is disposed in a compressed state between the first and second spring bearing members 28, 29.

The liquid discharge valve 6 is made up of a third shaft 31 supported by the float arm 22, a liquid discharge valve arm 32 mounted on the third shaft 31, and a liquid discharge valve body 33 secured to the liquid discharge valve arm 32 to establish and block communication between the interior of the closed vessel 2 and the liquid discharge port 17. The third shaft 31 is mounted bridgewise on the float arm 22 in parallel with the pivot shaft 21 and is positioned between the pivot shaft 21 and the second shaft 25. An upper end of the liquid discharge valve arm 32 is attached to the third shaft 31. A window 34 is formed in the sub-arm 23 so as not to obstruct the movement of the third shaft 31. The liquid discharge valve arm 32 is constituted by two plates and a valve body mounting shaft 35, which is parallel to the pivot shaft 21, is mounted bridgewise on lower ends of the two plates and a spherical center of the liquid discharge valve body 33 for opening and closing a liquid discharge valve port 36 is rotatably supported on the valve body mounting shaft 35. The liquid discharge valve port 36 is formed in a liquid discharge valve seat 37 which is fitted in the liquid discharge port 17 at an inner end of the closed vessel 2.

A leftward projecting abutting portion 38 is provided in the liquid discharge valve arm 32 and a bolt-like adjusting member 39 is threadedly engaged with the abutting portion 38. When the liquid discharge valve body 33 closes the liquid discharge valve port 36, the float arm 22 comes into abutment against the abutting portion 38 of the liquid discharge valve arm 32 through the adjusting member 39, so that the liquid discharge valve body 33 can be pushed against the liquid discharge valve port 36 through both adjusting member 39 and liquid discharge valve arm 32. By adjusting the amount of threaded engagement of the adjusting member 39 into the abutting portion 38 the float arm 22 can push the liquid discharge valve body 33 against the liquid discharge valve port 36 positively through both adjusting member 39 and liquid discharge valve arm 32 when the liquid discharge valve body 33 closes the liquid discharge valve port 36. Upon abutment of the float arm 22 against the adjusting member 39, the counterclockwise rotation of the float arm 22 is inhibited and therefore the adjusting member 39 acts as a lower-limit stopper for the float arm 22.

A stopper shaft 40 is mounted bridgewise on the bracket 27 at a right lower position with respect to the pivot shaft 21 and it is supported within the closed vessel 2 by the bracket 27. In the float arm 22 is formed a window 41 through which the stopper shaft 40 extends and the right end of the window 41 comes into abutment against the stopper shaft 40. As a result, the range of clockwise rotation of the float arm 22 with floating of the float 3 is restricted and hence the stopper shaft 40 acts as an upper-limit stopper for the float arm 22. In the sub-arm 23 is formed a window 42 through which the stopper shaft 40 extends, and by abutment of the right end of the window 42 against the stopper shaft 40, the range of clockwise rotation of the sub-arm 23 with descent of the float 3 is restricted and therefore the stopper 40 acts as a lower-limit stopper for the sub-arm 23. A connecting shaft 43 for connecting the two constituent plates of the float arm 22 is mounted bridgewise on the right end of the float arm 22.

A transfer shaft mounting shaft 45 is mounted bridgewise on the sub-arm 23 at a right upper position with respect to the stopper shaft 40 and a lower end of a power transfer shaft 46 is connected rotatably to the transfer shaft mounting shaft 45. An upper end of the power transfer shaft 46 is connected to the change-over valve 4. The change-over valve 4 is made up of an exhaust valve body 47 whose lower end is connected to the power transfer shaft 46, an intake/exhaust case 48 which receives therein the exhaust valve body 47 except a lower portion of the valve body 47, and an intake valve body 53. An operating rod 49 of a small diameter is integrally formed at an upper end of the exhaust valve body 47. The intake/exhaust case 48 is secured with screws (not shown) to the lid 8 of the closed vessel 2 and an intake valve port 50 of the working fluid inlet port 11 is formed in the intake/exhaust case 48. Below the intake valve port 50 and sideways there is formed an exhaust valve port 51 of the working fluid discharge port 13. The exhaust valve port 51 is opened and closed with a shoulder portion 52 of the exhaust valve body 47. A spherical intake valve body 53 for opening and closing the intake valve port 50 is disposed on the working fluid inlet port 11 side of the intake valve port 50. The intake valve 53 is operated for opening by an operating rod 49 of the exhaust valve body 47. When the exhaust valve port 51 is closed with the shoulder portion 52 of the exhaust valve body 47, the counterclockwise rotation of the sub-arm 23 is inhibited and thus the shoulder portion 52 of the exhaust valve body 47 acts as an upper-limit stopper for the sub-arm 23. The exhaust valve body 47 is swivel-stopped by a deflecting plate 55 which is integrally secured to the lid 8 of the closed vessel 2 with a screw 54.

An inlet-side check valve port 56 is formed in the closed vessel 2-side end of the liquid inlet port 16 and an inlet-side check valve body 57 for opening the inlet-side check valve port 56 inwards of the closed vessel 2 is secured to the lid 8 of the closed vessel. A discharge-side check valve port 58 is formed in the liquid discharge port 17-side end of the liquid discharge valve seat 37 and a discharge-side check valve body 59 for opening the discharge-side check valve port 58 toward the liquid discharge port 17 is secured to the liquid discharge valve seat 37.

Next, in connection with operation of the liquid pressure-feed device 1 of this embodiment, a series of operations performed in case of using steam as the working fluid will be described in order. As to external piping of the liquid pressure-feed device 1, the working fluid inlet port 11 is connected to a high-pressure steam source, the working fluid discharge port 13 is connected to a liquid generation source side, the liquid inlet port 16 is connected to a liquid generation source, and the liquid discharge port 17 is connected to a liquid pressure-feed destination.

When the liquid level in the closed vessel 2 is low, the float 3 is positioned on the bottom and the third shaft 31 and the transfer shaft mounting shaft 45 assume respective lower positions. Consequently, the liquid discharge valve arm 32 and the power transfer shaft 46 are displaced to respective lower positions. At this time, the liquid discharge valve body 33 closes the liquid discharge valve port 36, the intake valve body 53 closes the intake valve port 50, and the exhaust valve body 47 opens the exhaust valve port 51. Further, the inlet-side check valve body 57 opens the inlet-side check valve port 56 and the discharge-side check valve body 59 closes the discharge-side check valve port 58. When the liquid present on the liquid generation source side flows down from the liquid inlet port 16 into the closed vessel 2 and stays there and the float 3 rises with a rise in liquid level within the closed vessel 2, the float arm 22 turns clockwise around the pivot shaft 21 and the third shaft 31 moves upward and so does the liquid discharge valve arm 32. With this upward movement of the liquid discharge valve arm 32, the liquid discharge valve body 33 moves upward while rotating and opens the liquid discharge valve port 36.

On the other hand, on the snap mechanism 5 side, when the float arm 22 turns clockwise around the pivot shaft 21, the first shaft 24 as a connection with the coil spring 26 moves upward and approaches an extension line joining the pivot shaft 21 and the second shaft 25, so that the coil spring 26 is compressed and deformed. When the float 3 further rises and the first shaft 24 moves to a higher level than the extension line joining the pivot shaft 21 and the second shaft 25, the coil spring 26 recovers from deformation rapidly, so that the sub-arm 23 turns counterclockwise and the transfer shaft mounting shaft 45 performs snap-movement upward. As a result, the exhaust valve body 47 moves upward through the power transfer shaft 46 connected to the transfer shaft mounting shaft 45 and closes the exhaust valve port 51, causing the intake valve body 53 to move upward in the course of the upward movement of the exhaust valve body 47 to open the intake valve port 50.

When the exhaust valve port 51 is closed and the intake valve port 50 is opened, high-pressure steam is introduced from the working fluid inlet port 11 into the closed vessel 2, with consequent rise of the internal pressure of the closed vessel 2. As a result, the inlet-side check valve body 57 closes the inlet-side check valve port 56 and the discharge-side check valve body 59 opens the discharge-side check valve port 58, whereby the liquid accumulated within the closed vessel 2 is fed under pressure to the liquid pressure-feed destination from the liquid discharge port 17.

When the liquid level in the closed vessel 2 drops and the float 3 descends as a result of the pressure-feed of liquid, the float arm 22 turns counterclockwise around the pivot shaft 21 and the third shaft 31 moves downward and so does the liquid discharge valve arm 32. With this downward movement of the liquid discharge valve arm 32, the liquid discharge valve body 33 moves downward while rotating and closes the liquid discharge valve port 36.

On the other hand, on the snap mechanism 5 side, when the float arm 22 pivots counterclockwise around the pivot shaft 21, the first shaft 24 as a connection with the coil spring 26 moves downward and approaches the extension line joining the pivot shaft 21 and the second shaft 25, so that the coil spring 26 is compressed and deformed. As the float 3 further descends and the first shaft 24 moves lower than the extension line joining the pivot shaft 21 and the second shaft 25, the coil spring 26 recovers from deformation rapidly, so that the sub-arm 23 turns clockwise and the transfer shaft mounting shaft 45 performs snap-movement downward. As a result, the exhaust valve body 47 moves downward through the power transfer shaft 46 connected to the transfer shaft mounting shaft 45 to open the exhaust valve port 51. Further, in the course of the downward movement of the exhaust valve body 47 the intake valve body 53 moves downward and closes the intake valve port 50.

When the exhaust valve port 51 is opened and the intake valve port 50 is closed, the high-pressure steam present within the closed vessel 2 is discharged from the working fluid discharge port 13 to the liquid generation source side and the internal pressure of the closed vessel 2 drops. As a result, the inlet-side check valve body 57 opens the inlet-side check valve port 56 and the discharge-side check valve body 59 closes the discharge-side check valve port 58. Consequently, liquid again flows down into the closed vessel 2 and stays there.

What is claimed is:

1. A liquid pressure-feed device comprising:
    a closed vessel, the closed vessel having:
        a working fluid inlet port, a working fluid discharge port, a liquid inlet port, and a liquid discharge port; and
        a float, a change-over valve, a snap mechanism, and a liquid discharge valve provided within the closed vessel;
    wherein the snap mechanism comprises:
        a pivot shaft supported within the closed vessel,
        a float arm and a sub-arm both adapted to rotate about the pivot shaft,
        a first shaft supported by the float arm,
        a second shaft supported by the sub-arm, and
        a spring mounted between the first and second shafts;
    wherein the liquid discharge valve comprises:
        a third shaft supported by the float arm,
        a liquid discharge valve arm mounted to the third shaft, and
        a liquid discharge valve body mounted to the liquid discharge valve arm to establish and block communication between the interior of the closed vessel and the liquid discharge port;
    wherein the float is connected to the float arm,
    wherein the change-over valve is connected to the sub-arm through a power transfer shaft, and
    wherein the third shaft is provided between the pivot shaft and the second shaft and a window is formed in the sub-arm so as not to obstruct movement of the third shaft.

* * * * *